United States Patent [19]
Espino et al.

[11] 3,888,896
[45] June 10, 1975

[54] METHANOL PRODUCTION

[75] Inventors: Ramon L. Espino, New York; Thomas S. Pletzke, Cambria Heights, both of N.Y.

[73] Assignee: Chem Systems Inc., New York, N.Y.

[22] Filed: May 29, 1973

[21] Appl. No.: 364,347

[52] U.S. Cl. .............................................. 260/449.5
[51] Int. Cl. ............................................... C07c 31/06
[58] Field of Search ..................... 260/449.5, 449 L

[56] References Cited
UNITED STATES PATENTS

| | | | |
|---|---|---|---|
| 1,788,170 | 1/1931 | Pier et al. ......................... | 260/449.5 |
| 2,207,581 | 7/1940 | Duftschmid et al. ............. | 260/449 L |
| 2,438,029 | 3/1948 | Atwell .............................. | 260/449 L |
| 2,474,583 | 6/1949 | Lewis ............................... | 260/449.5 |
| 2,617,816 | 11/1952 | Crowell et al. ................... | 260/449 L |
| 2,775,607 | 12/1956 | Kolbel et al. ..................... | 260/449 L |
| 2,789,888 | 4/1957 | Tenney et al. .................... | 260/449 L |
| 2,852,350 | 9/1958 | Kolbel et al. ..................... | 260/449 L |
| 3,254,967 | 6/1966 | Wentworth ....................... | 260/449.5 |
| 3,326,956 | 6/1967 | Davies et al. ..................... | 260/449.5 |
| 3,501,516 | 3/1970 | Parrish .............................. | 260/449.5 |

*Primary Examiner*—Howard T. Mars
*Attorney, Agent, or Firm*—Bert J. Lewen, Esq.

[57] ABSTRACT

Methanol is prepared from carbon monoxide and hydrogen by saturating an inert organic liquid medium, such as pseudocumene, with the carbon monoxide and hydrogen and contacting the saturated liquid medium with a methanol-forming catalyst such as those containing zinc and chromium.

4 Claims, No Drawings

3,888,896

METHANOL PRODUCTION

DESCRIPTION OF THE INVENTION

This invention relates to a new and improved process for preparing methanol from carbon monoxide and hydrogen. More specifically, the instant invention teaches a process for forming methanol by saturating an inert liquid phase with the reactants and contacting the saturated liquid with a methanol-forming catalyst.

Methanol's use as an industrial chemical is well established. The annual volume throughout the world is over 5 million metric tons. It is used as an intermediate in the production of formaldehyde, dimethyl terephthalate, methyl amines, methyl methacrylate, and as an industrial solvent. Additionally, methanol is now being seriously considered as a fuel. Since it is a liquid under normal conditions, it is an attractive alternative to the importation of liquified natural gas, which must be maintained under high pressure and has proven to be dangerous during transportation and storage.

Since the beginning of the century, methanol has been commercially synthesized from carbon monoxide and hydrogen. In order to obtain reasonable conversion of these raw materials, thermodynamic practices have dictated that the reaction be performed under very substantial pressures, up to 5,000 psia. High temperatures and catalysts have been employed to increase the rate of reaction and to minimize the formation of other products, such as methane and higher molecular weight alcohols. While reaction conversions up to 90%, based on carbon monoxide, are technically feasible, high conversions are not used because of the great amount of heat generated by the reaction. In order to dissipate this quantity of heat, it is necessary to use very expensive reactors, such as multi-tube reactors, to carry out the process. In commercial practice, the need to avoid such expensive equipment has mandated that the conversion of carbon monoxide and hydrogen be limited to less than 10 percent. Naturally, these low conversions are disadvantageous from other aspects. For example, the low conversion per pass requires that all the unreacted carbon monoxide and hydrogen be recycled back to the reactor. This operation requires the use of compressors which are not only expensive, but costly to operate. A low conversion per pass also causes the productivity per unit volume of reactor to be low. Thus, if the conversion level can be doubled, the reactor productivity is doubled.

Even with the introduction of specialized catalysts, such as those developed by Imperial Chemicals Industries in the early 1960's (see U.S. Pat. No. 3,326,956), commercial practice dictates running the reaction at a low conversion per pass. While these catalysts permitted operation at milder operating conditions, thereby saving compression and equipment costs, the basic problem of dissipating the large amounts of heat produced at high conversions has not been overcome.

In accordance with the invention, it has been discovered that the reaction of carbon monoxide and hydrogen to form methanol may be successfully performed at high conversion per pass in an inert liquid medium. The inert liquid medium is saturated with the reactants and contacted with a methanolforming catalyst. Surprisingly, the rate of the reaction and the selectivity of the system to methanol remains at commercially attractive levels. That the catalytic action continues at a significant rate in the presence of a liquid medium would not generally be expected because both carbon monoxide and hydrogen are only sparsely soluble at the temperature at which the reaction takes place.

This discovery is of enormous commercial importance. By following the teaching of the invention, higher conversion levels may be used and heat dissipation simplified because the liquid having a high heat capacity absorbs the heat of the reaction via direct heat transfer. More specifically, calculations show that at 35 percent conversion of a gas feed containing 15 percent carbon monoxide, the heat of the reaction causes the temperature of the gas to increase by 150° C. If, on the other hand, an inert liquid such as pseudocumene is flowed through the reactor at a rate of 1 liter of liquid per 20 liters of gas at standard conditions, the temperature will increase by less than 5° C. even at gas conversions of 60 percent. Expensive reactors with large heat transfer surfaces are thereby eliminated. Higher productivity per reaction volume is obtained and compression costs for recycle gas reduced.

This process must be distinguished from that described in U.S. Pat. No. 3,689,575 where methanol is produced by reacting carbon monoxide with water. While it is taught that it is advantageous to maintain the water as a liquid, such teaching differs in that the water is a reactant, not an inert medium, and the process of the patent forms large amounts of carbon dioxide. Additionally, to maintain the water in the liquid phase at the temperatures used, extremely high pressures are necessary. While some water is formed in the reaction of the invention, its introduction with the feed is not generally desirable.

The reaction may be carried out in numerous ways, as will be readily understood by those skilled in the art. For example, a fixed bed tubular reactor wherein the liquid and the gas flow through a catalyst bed, or a fluid bed reactor wherein a finely divided catalyst is fluidized mainly by the liquid and the gas flowing up through the solid-liquid fluidized mass, may be used.

The liquid medium used in the practice of the invention must be capable of dissolving at least small amounts of hydrogen and carbon monoxide, must be stable and inert, and must remain a liquid under the reaction conditions. Naturally, also, the catalyst must not dissolve nor react with the liquid medium. Preferably, the inert liquid medium must dissolve at least 0.0001 gm. mole of hydrogen and carbon monoxide at the reaction conditions per cc. of liquid. The vapor pressure of the liquid should not exceed 500 psia at a temperature of 250° C. Organic compounds are best.

Polyalkylbenzenes are particurly useful as the liquid medium. These compounds have from 1 to 5 alkyl substituents on the benzene ring. The alkyl groups may contain from 1 to 3 carbon atoms; however, the total substituted alkyl groups should not have more than 6 carbon atoms. The boiling range of these compounds is from 100° to 250° C, Such compounds include: pseudocumene, toluene, xylene, durene, isodurene, mesitylene, ethyl benzene, diethyl benzene, and isopropyl benzene. Other liquids include carboxylic acids having 2 to 10 carbon atoms, e.g., butyric acid and trimethylacetic acid; alcohols having from 5 to 20 carbon atoms, e.g., cyclohexanol and n-octyl alcohol; esters having from 5 to 10 carbon atoms, e.g., n-amyl acetate and ethyl n-valerate; ketones having from 6 to 12 carbon atoms, e.g., di-n-propyl ketone and cyclohexanone; aldehydes having 6 to 12 carbon atoms, e.g., n-heptaldehyde; paraffins and cycloparaffins having 8 to 40 carbon atoms, e.g., decane and cyclododecane; chlorinated paraffins and aromatics, e.g., chlorobenzene, 1-chlorododecane, and chlorinated naphthalenes; and silicon oils.

The reaction temperature is broadly from 100° to 500° C. and preferably from 200° to 400° C. Pressures of 200 to 10,000 psia, preferably from 500 to 3,500 psia, may be employed. With regard to the reactants, it is desirable that the amount of hydrogen be in excess of the stoichiometric requirements. Broadly, up to five times the stoichiometric requirements of hydrogen may be used, preferably up to four times. The stoichiometric requirements call for two moles of hydrogen for each mole of carbon monoxide to produce methanol. If desired, carbon dioxide may be added to the feed to assist in achieving equilibrium and reducing the formation of unwanted by-products such as dimethyl ether and methane. Since three moles of hydrogen are required to convert one mole of carbon dioxide to methane, the amount of hydrogen added should be adjusted accordingly to maintain the appropriate stoichiometric excess. The flow rate of the reactants is broadly from 0.1 to 10.0 pounds of feed per pound of catalyst per hour and preferably from 0.5 to 5.0 pounds of feed per pound of catalyst per hour.

Any methanol-forming catalyst may be applied to the practice of the instant invention. The conventional mixture of chromium and zinc is useful. Most preferred are the chromium and zinc catalyst described in the Imperial Chemical Industries U.S. Pat. No. 3,326,956. Other catalysts include the oxides of tungsten, uranium, molybdenum, aluminum, cobalt, silver and the rare earth metals and mixtures thereof with zinc and chromium oxides.

The size of the catalyst used may be readily selected by one skilled in the art. For example, if a fluidized bed is used, the catalyst may be from 200 microns to 3/16 inch. In the case of fixed bed operation, the catalyst may range from 1/8 inch to 1/4 inch in diameter, the choice being determined mainly by the pressure drop allowable in the reactor.

The liquid flow rate through the reactor, if a fluidized system is used, should be sufficient to expand the fluid bed by at least 5 percent, preferably from 20 to 50 percent. Higher expansion levels up to 100 percent are feasible but probably not economical. Where a fixed bed system is used, sufficient liquid should be used to absorb the heat of reaction. The amount of liquid medium is also determined by the optimum temperature differential in the reactor, as will be readily understood by those skilled in the art.

EXAMPLE 1

To further illustrate the invention, a 1/2 inch nominal diameter by 24 inch metal reactor enclosed in a lead-tin eutectic mixture in its annular space and electrically heated is filled with catalyst made in accordance with the following procedure:

A mixture of 100 ml. of deionized water, 522 g. of $Cu(NO_3)_2 \cdot 3 H_2O$, 187.5 g. of $Zn(NO_3)_2 \cdot 6 H_2O$ and 84 g. of $Cr(NO_3)_2 \cdot 9 H_2O$ are heated to 90° C. with stirring in a 1,000 ml. three-necked flask. Sufficient sodium carbonate, as a 50 percent aqueous solution, is added to adjust the pH to between 7 and 7.2 at room temperature. After cooling to room temperature, the solids are precipitated, filtered, water washed and dried in an oven initially at 120° C. and thereafter with air in a furnace at 250° to 260° C. for 24 hours. The powder is crushed to less than 30 mesh, mixed with 5 percent graphite and formed into 1/8 inch pellets. About 95 g. of the resulting pellets are reduced with hydrogen in the metal reactor at atmospheric pressure and a maximum temperature of 250° C. for 6 hours.

In order to determine the feasibility of the invention, a mixture of $H_2/CO$ in a volumetric ratio of 3:1 (a 50 percent excess of $H_2$) is passed into the reactor through a sintered metal plate at the rate of about 100 g. per hour. Six runs are performed at a pressure of 1,500 psig. In the first three runs, the hydrogen-carbon monoxide mixture is passed over the catalyst in the absence of a liquid. In a second three runs, in accordance with the invention, the reactor is filled with pseudocumene. In all cases, the reaction is carried out under substantially identical conditions. The effluent gas is analysed for carbon monoxide conversion and percent methanol in the effluent. The results are shown in Table 1 below.

Table 1

| Run | Temp °C | Gas Flow Liters/Hr. | % CO Conv. | % Methanol in Gas | WHSV Lbs of Feed Hr-Lb of Cat |
|---|---|---|---|---|---|
| 1 | 255 | 340 | 9.8 | <5.0 | 1.22 |
| 2 | 262 | 210 | 11.7 | 5.0 | 0.75 |
| 3 | 283 | 180 | 19.6 | 5.2 | 0.65 |
| 4* | 256 | 314 | 5.6 | 2.6 | 1.13 |
| 5* | 256 | 300 | 5.0 | 3.9 | 1.08 |
| 6* | 279 | 300 | 11.0 | 4.77 | 1.08 |

* In pseudocumene.

As can be seen from the above data, when the reactor is filled with pseudocumene, the conversion of carbon monoxide and the production of methanol decreases. Though this decrease is significant, it is very surprising that the methanol is formed at all. These runs, therefore, clearly demonstrate the feasibility of performing the invention in a liquid medium as described herein.

Example 2

Using the equipment described in Example 1, three more runs are performed. The catalyst, one designed for use in the high pressure synthesis of methanol at pressures of from 4,000 to 5,000 psig and temperatures of from 350° to 400° C., contains 74% ZnO and 26% $CrO_3$ (Harshaw Company Zn-0312T). Thirty-five grams of 8 to 10 mesh catalyst pellets are loaded into the reactor, the remainder being filled with inert silicon carbide pellets. Using a mixture of $H_2/CO$ in a volumetric ratio of 3:1, the inlet gas rate is 100 liters/hr. at STP. The space velocity is 1.0 lb. feed/hr.-lb. of catalyst. Three runs are performed. The first two, in accordance with the invention, flow pseudocumene through the reactor at a rate of 0.24 liter/hr. No inert liquid medium is used in the last run. The following results are obtained:

Table 2

| Run | Temp °C | Pressure psig | % CO Conv. | % Methanol in Gas |
|---|---|---|---|---|
| 7 | 360 | 1700 | 14 | 3.5 |
| 8 | 383 | 1700 | 21 | 6.0 |
| 9 | 374 | 1650 | 26 | 6.8 |

The above table shows that the addition of the inert liquid medium results in only a small decrease in conversion at comparable reaction conditions. While high conversions can be carried out isothermally in the small reactor used in these experiments when liquid is not flowing along with the gas, the high temperature increase could not be tolerated, at least as far as economically feasible operation is concerned, in large scale commercial equipment. Calculations show that in the case of Run No. 8 the increase in temperature would be 64° C., an acceptable temperature rise, while in Run No. 9 the temperature would rise 265° C., a temperature rise which would require radical cooling of the inlet gases or the use of multistage operation with intermediate cooling steps. This is a clear indication of the commercial advantage of the subject invention.

Having thus described our invention, what we claim and desire to protect by Letters Patent is:

1. In a process for the catalytic preparation of methanol from carbon monoxide and hydrogen in the presence of a methanol-forming catalyst comprising zinc and chromium, the improvement of saturating a polyalkylbenzene selected from the group consisting of pseudocumene, xylene, durene, isodurene, mesitylene and diethyl benzene. With carbon monoxide and at least 2 moles of hydrogen per mole of carbon monoxide and contacting the saturated polyalkylbenzene at a temperature of from 200° to 400° C., and a pressure of from 200 to 10,000 psia.

2. The process of claim 1 wherein the polyalkylbenzene is pseudocumene.

3. The process of claim 1 wherein the methanolforming catalyst also contains copper.

4. The process of claim 1 wherein the reaction is carried out at a pressure of from 500 to 3,500 psia.

* * * * *

UNITED STATES PATENT AND TRADEMARK OFFICE
CERTIFICATE OF CORRECTION

PATENT NO. : 3,888,896
DATED : June 10, 1975
INVENTOR(S) : Ramon L. Espino et al.

It is certified that error appears in the above-identified patent and that said Letters Patent are hereby corrected as shown below:

Claim 1, line 1: delete "catalytic";

line 3: delete "comprising" and substitute --of--;

line 7: delete ". With" and substitute --with the--;

line 9: delete "and contacting the saturated polyalkylbenzene";

line 12: delete "from".

Signed and Sealed this twenty-third Day of December 1975

[SEAL]

Attest:

RUTH C. MASON
*Attesting Officer*

C. MARSHALL DANN
*Commissioner of Patents and Trademarks*